United States Patent [19]

Aron et al.

[11] 4,405,939

[45] Sep. 20, 1983

[54] METHOD FOR MAKING A DIRECTION SENSITIVE CONTRAST ENHANCEMENT FILTER

[75] Inventors: Mitchell Aron, Harrington Park; Emanuel Sosinsky, Teaneck, both of N.J.

[73] Assignee: The Bendix Corporation, Teterboro, N.J.

[21] Appl. No.: 316,465

[22] Filed: Oct. 30, 1981

[51] Int. Cl.3 .............................................. H04N 9/16

[52] U.S. Cl. ...................................................... 358/65

[58] Field of Search ..................... 358/65, 64, 230, 66, 358/250, 252; 29/25.11, 316

[56] References Cited

U.S. PATENT DOCUMENTS 3,439,207 4/1969 Barten .................................. 358/65

*Primary Examiner*—Michael A. Masinick

*Attorney, Agent, or Firm*—Joseph E. Funk; Stanley N. Protigal; Anthony F. Cuoco

[57] ABSTRACT

A method for making a direction sensitive contrast enhancement filter for a shadow mask color cathode ray tube is disclosed to minimize the amplitude of moire interference patterns to unnoticeable or unobjectionable levels. For a particular color cathode ray tube phosphor dot size, the light transmission through a direction sensitive enhancement filter having a given hole size and spacing is determined mathematically. The filter is then moved a number of fixed increments with respect to the phosphor dot and the light transmission is determined for each incremented position. The variation in light transmission as the filter is moved incrementally across the phosphor dot is the data recorded. This procedure is repeated for different hole sizes and different hole spacings and the data graphed to find the minimum light transmission variation. At this minimum light transmission variation moire patterns are reduced to unnoticeable or unobjectional levels. A selected planar material then has holes or optically clear channels of the selected radius and spacing placed therethrough to make the filter.

7 Claims, 8 Drawing Figures

METHOD FOR MAKING A DIRECTION SENSITIVE CONTRAST ENHANCEMENT FILTER

FIELD OF THE INVENTION

This invention relates to direction sensitive contrast enhancement filters.

BACKGROUND OF THE ART

It has long been observed that cathode ray tube displays are relatively unusable in high ambient light environments. This problem has prevented the use of cathode ray tube displays in aircraft, such as jet fighter aircraft, in which high ambient light conditions are normal during daylight operation. To overcome this problem, direction sensitive contrast enhancement filters have been developed which are mounted on the face plate of cathode ray tubes in this application. These filters prevent most ambient light from striking the face of the tube but allow an observer to see a usable visual display on the face of the cathode ray tube under the high ambient light conditions. These contrast enhancement filters typically comprise a plate having a large number of very small holes therethrough, and the plate and the interior areas of the holes are all blackened to absorb ambient light before it strikes the face of the cathode ray tube. These filters allow an observer to see the display on the face of the tube within a cone of vision in front of the cathode ray tube. The size of this cone of vision is a function of the ratio of the hole diameter to the filter thickness. In the prior art, direction sensitive contrast enhancement filters were unusable with shadow mask type color cathode ray tubes due to moire interference patterns which were created. These patterns are created because the amount of light that is transmitted by each phosphor dot depends upon the open area of the holes in the filter that expose each phoshor dot. This open area will in general be different for each phosphor dot and since both the phosphor dots and filter holes are each ordered arrays, a moire modulation pattern is created which interferes with the desired picture and/or data. It has been generally accepted by the industry that direction sensitive contrast enhancement filters are not useable with shadow mask tubes because of this moire interference. It is this problem in the prior art that the subject invention solves.

It is an object of this invention to teach a method for making a direction sensitive contrast enhancement filter for a specific color cathode ray tube having dots of color phosphor of any size and shape and in any ordered arrangement by selecting filter hole size and spacing to minimize moire interference patterns to unnoticeable or unobjectionable levels.

SUMMARY OF THE INVENTION

In accordance with our invention we teach a method for making a direction sensitive contract enhancement filter from a planar piece of material to provide unnoticeable or unobjectable moire pattern interference when used with a shadow mask color cathode ray tube display in high ambient light environments, where the filter has a plurality of holes therethrough of any given pattern such that the center-to-center spacing between the holes is equidistant.

To understand our method of making direction sensitive contrast enhancement filters, it must first be recognized that the phosphor dot diameter used on a shadow mask tube is made as small as possible in order to minimize picture degradation that results when displaying fine detail. If the filter holes were to be made larger than the phosphor dots this would degrade the picture in this regard beyond the limits that are already imposed by the existing phosphor dot structure. Thus our invention relates only to filters wherein the filter holes are smaller than the diameter of each dot of color phosphor on the face of a shadow mask type color cathode ray tube (CRT). An observer in front of a CRT equipped with such a filter will see each phosphor dot through different combinations of the holes through the enhancement filter. It is this fact that is used as the starting point in determining the spacing and size of the holes made through a planar piece of opaque material to make contrast enhancement filters. First the amount of light that may be observed from one phosphor dot through the holes of an exemplary contrast enhancement filter is calculated and compared to the amount of light that may be seen from one dot without such a filter. This is called the transmission ratio. The filter is then moved incrementally with respect to the phosphor dot and again the transmission ratio is determined. This is determined by computing the ratio of the sum of the areas of the portions of one group of the filter holes that overlap or partially overlap the area of a phosphor dot over the area of the phosphor dot. This procedure is repeated for a large number of incremental positions of the filter. Thereafter, using the data obtained, the percent variations in the calculated amplitude of the light passing through the enhancement filter is computed and graphed. This same procedure is then repeated for different combinations of filter hole diameters and hole spacings and the resultant transmission ratios are determined. The particular combination of hole diameter and hole spacing that yields the minimum percent variations as the filter is incrementally moved will yield minimum moire interference patterns. After balancing between an acceptable transmission ratio and an acceptable percent of light output variation, the resultant hole size and hole spacing is determined and the holes are etched or otherwise made through the planar piece of material to make the contrast enhancement filter.

BRIEF DESCRIPTION OF DRAWING

Our novel method of making contrast enhancement filters will be better understood upon reading the following detailed specification in conjunction with the drawing in which:

FIG. 1 shows the general orientation of a direction sensitive contract enhancement filter with respect to a cathode ray tube display. The techniques and variations of contrast enhancement filters are known in the art, and one type of these filters utilizes an ordered array of a large number of very small holes 10 through the direction enhancement filter 11, which is mounted or bonded against the face of a CRT 12. These small holes are usually made by a photoetching process, although other processes can be used.

In conventional shadow mask color cathode ray tubes dots of red, blue and green phosphor are placed in ordered arrays on the rear of the front glass plate of the tube. Each of these exemplary phosphor dots is typically in the order of 0.130 millimeters diameter.

Figure 1:
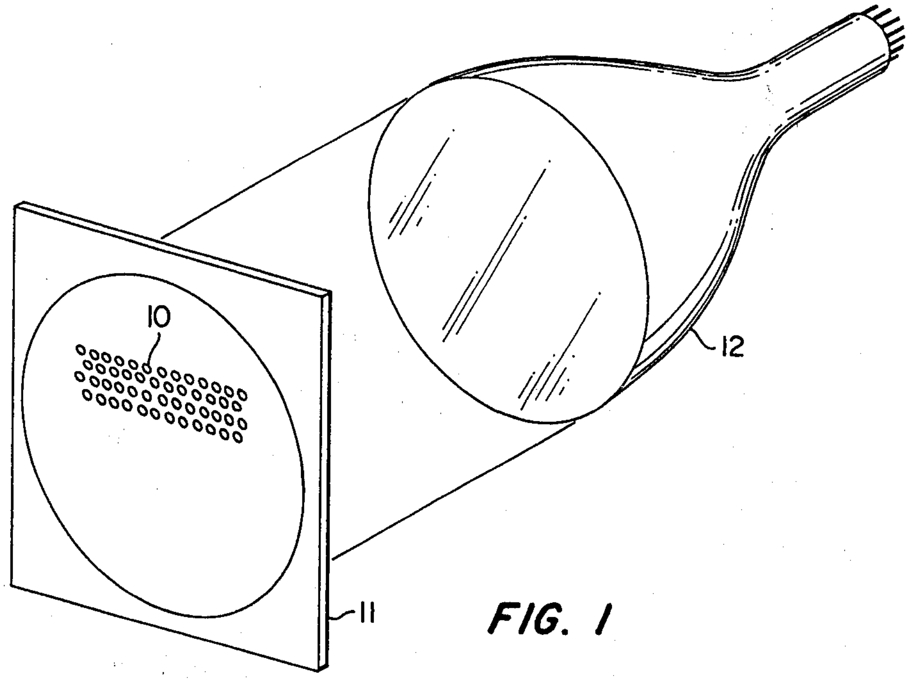
FIG. 1 shows the physical orientation of a direction sensitive contrast enhancement filter with respect to a cathode ray tube.
Figure 2:
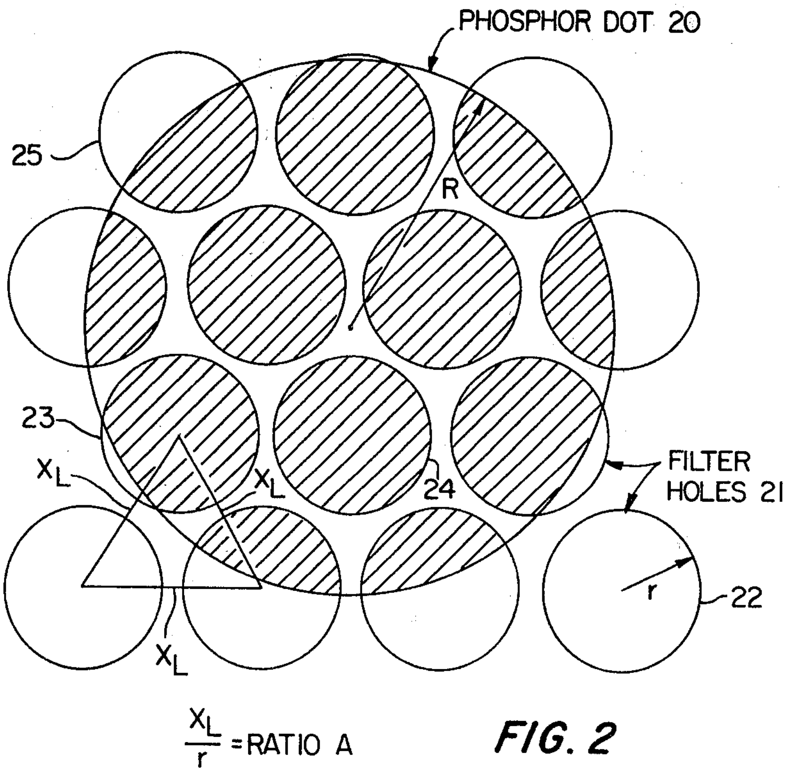
FIG. 2 shows an exemplary physical size relationship and orientation between a color phosphor dot and the holes through a contrast enhancement filter used to explain our method of making such filters.

In FIG. 2 is shown an exemplary enlarged representation of a front view of a portion of a contrast enhancement filter overlaid on a phosphor dot 20 of a color cathode ray tube. Shown are a multiplicity of filter holes 21, each having a radius r and the center-to-center spacing between any two filter holes is $X_L$ as indicated. The phosphor dot 20 has a radius R and is shown superposed under the filter holes 21. In this exemplary representation, the radius R of phosphor dot 20 is approximately four times the radius r of each of filter holes 21. With a phosphor dot of conventional size and having a radius R of about 0.065 millimeters, the radius r of the filter holes 21 is approximately 0.016 millimeters. While the approximate relationships between the sizes of filter holes and phosphor dots shown in FIG. 2 may represent a contrast enhancement filter known in the art, it is not representative of a contrast enhancement filter made using our novel method. FIG. 2 is drawn in this manner, however, to help understand the implementation of our novel method. This will be better understood upon reading further in this specification.

As seen in FIG. 2, phosphor dot 20 and individual ones of filter holes 21 may overlap by differing amounts. For example, hole 22 does not overlap the circular area of phosphor dot 20 at all, while filter hole 23 almost completely overlaps phosphor dot 20 and filter hole 24 completely overlaps phosphor dot 20. Filter hole 25 only partially overlaps phosphor dot 20. This understanding that the ones of filter holes 21 that overlap phosphor dot 20 in varying degrees is the basis for the discussion now given with reference to FIGS. 3 through 6.

Figure 3:
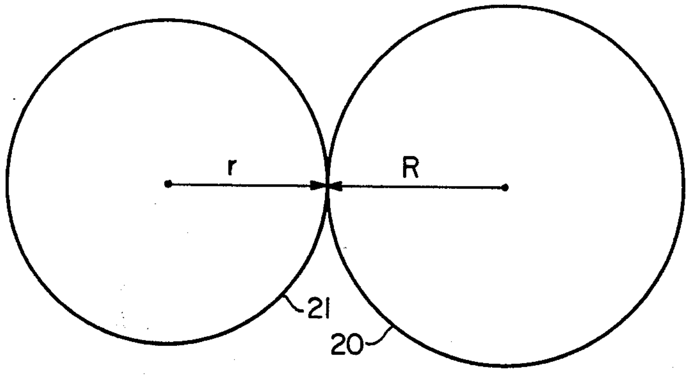
FIGS. 3–6 show the geometric relationships between a phosphor dot and filter holes used in the analysis to select filter hole diameter and spacing to make our novel filters.

In FIG. 3 are shown two circles of approximately the same size. The circle having the radius R is representative of phosphor dot 20 in FIG. 2. The smaller circle having a radius r is representative of a filter holes 21 shown in FIG. 2. These circles are shown in approximately the same size for ease of presentation of the mathematical relationships now to be described, and is not meant to represent that the radius r of a filter hole must be close to the radius R of a phosphor dot 20. In FIG. 3, phosphor dot 20 does not overlap filter hole 21 at all and light emitted from phosphor dot 20 cannot pass through filter hole 21. With reference to FIG. 2, light emitted by phosphor dot 20 can only pass through those portions of filter holes 21 that at least partially overlap dot 20. Thus, it is obvious that less than 100% of the light emitted by phosphor dot 20 can be seen by the viewer looking at the face of the cathode ray tube looking through a contrast enhancement filter having filter holes 21.

Figure 4:
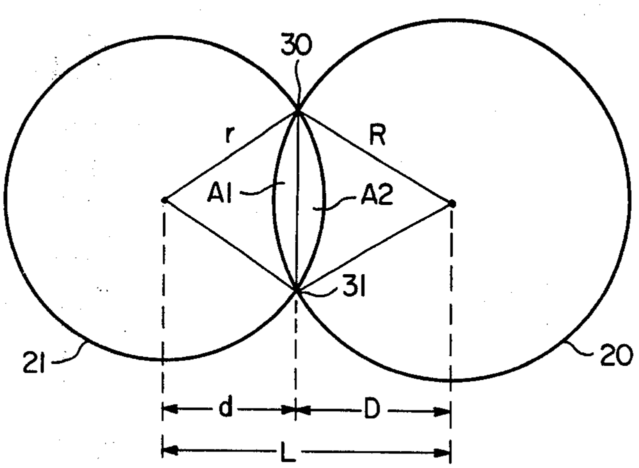

In FIG. 4 are shown two circles, circle 20 having a radius R again representing phosphor dot 20 and the small circle 21 having a radius r representing a filter hole 21. These circles 20 and 21 only overlap a small amount as shown. In this case only that light emitted from the small area A1 plus A2 of phosphor dot 20 which overlaps the filter hole 21 will be observed in front of the contrast enhancement filter.

Figure 5:
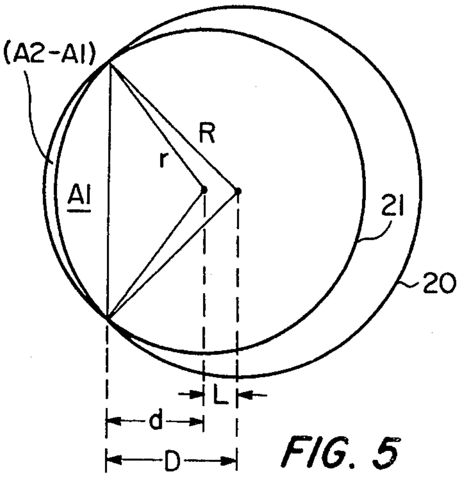

In FIG. 5 holes 20 and 21 are almost completely overlapped and light emitted by that portion of the area of phosphor dot 20 equal to the area of filter hole 21 less the difference in areas A2 and A1 will be seen by an observer in front of the filter.

Figure 6:
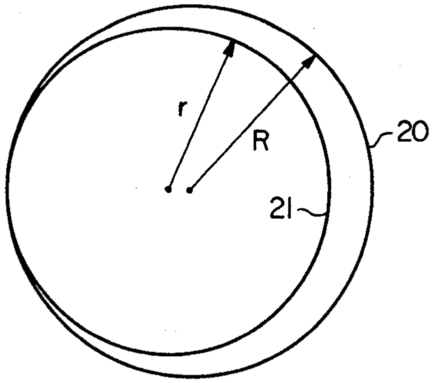

Finally, as shown in FIG. 6, with complete overlap of holes 20 and 21 light emitted from that portion of the area of phosphor dot 20 equal to the area of filter hole 21 will pass through to be seen by an observer.

With this general discussion regarding FIGS. 3 through 6, and looking at FIG. 2, it can be understood that the total area of the ones of filter holes 21 that overlap phosphor dot 20 represents the amount of light that will pass through the filter from one phosphor dot. Also less than 100% of the light emitted by a phosphor dot 20 will pass through the contrast enhancement filter to be observed by a viewer. The percentage of light that will pass through the contrast enhancement filter may be called the transmission ratio where the numerator of the ratio is equal to that area of the ones of filter holes 21 that overlaps the area of phosphor dots 20 as previously described, and the denominator of the ratio is equal to the area of phosphor dot 20. The calculation of the total area of the ones of filter holes 21 that completely or partially overlapping phosphor dot 20 can be calculated with the discussion now given with reference to FIGS. 3 through 6.

As already stated, in FIG. 3 there is no overlap between circles 20 and 21 so there is no overlapping area to be considered. In FIG. 4, however, there is an overlap between circles 20 and 21 equal to the summation of those areas designated A1 and A2. The intersection of circles 20 and 21 are the points 30 and 31 as shown. A line is drawn between points 30 and 31 and a line can be drawn from the center of each circle perpendicular to this line. For smaller circle 21 the perpendicular line would have a length d and for larger circle 20 this perpendicular line would have a length D. The distance between the centers of circles 20 and 21 is defined as L. Using known geometric principles the area A1 and A2 may be calculated. The equations that are easily derived to find the area A1 and A2 are given immediately hereinbelow as equation A and equation B, respectively.

Equation A: $$A1 = R^2 \cos^{-1}(D/R) - D\sqrt{R^2 - D^2}$$

Equation B: $$A2 = r^2 \cos^{-1}(d/r) - d\sqrt{r^2 - d^2}$$

As previously stated, the area of the overlap between circles 20 and 21 in FIG. 4 is equal to the sum of area A1 plus A2 and may be represented by equation C.

Equation C: $$A_T = A1 + A2$$

Using the law of cosines the distances d and D defined hereinabove, and shown on FIG. 4 may be calculated and are given by equations D and E.

Equation D: $$d = \frac{L^2 + r^2 - R^2}{2L}$$

Equation E: $$D = \frac{L^2 + R^2 - r^2}{2L}$$

While Equations A through E will be useful in the overlapping hole case shown in FIG. 4 in which the distance L between the centers of the two circles is greater than the distance D, there are instances in which the distance L is less than the dimension D as shown in FIG. 5. Simply, the area of overlap of circles 20 and 21 in FIG. 5 is equal to the area of the small circle 21 minus the crescent shaped ara represented as (A2-A1). In equation form this is represented as equation F.

Equation F: $A_T=\pi r2-A2+A1$

The laws of sines and cosines is used to calculate the distance d and in equation form is given as equation G.

$$\text{Equation G: } d=\sqrt{r^2-R^2\left[1-\left(\frac{R^2+L^2-r^2}{2RL}\right)^2\right]}$$

In FIG. 6, the area of overlap between circles 20 and 21 is easily recognized as the area of smaller circle 21 which is equal to $\pi r^2$.

With reference to FIGS. 3 through 6 the transmission ratio is equal to the area of overlap between circles 20 and 21 divided by the area of the larger circle 20. In FIG. 3 there is no overlap between circles 20 and 21 and the transmission ratio would be zero. In FIG. 4 the transmission ratio would be equal to $(A1+A2)\pi R^2$. In FIG. 5 the transmission ratio would be equal to $(\pi r^2-A2+A1)\ \pi R^2$. In FIG. 6 the transmission ratio would be equal to $\pi r^2\ \pi R^2$.

Utilizing the equations developed above with regard to FIGS. 3 through 6, the sum total of the overlapping areas can be calculated, and when divided by the area of phosphor dot 20 we derive the transmission ratio for the example represented by FIG. 2. As is obvious, the lower the transmission ratio the less the light emitted by each phosphor dot is seen by an observer in front of a cathode ray tube equipped with the contrast enhancement filter.

With a particular filter hole radius r, filter hole spacing $X_L$ and hole pattern, an analysis is made like that described with reference to FIG. 2 hereinabove. Once the transmission ratio has been calculated for a particular overlay orientation of filter holes and a phosphor dot such as shown in FIG. 2, the next step is to incrementally move all the filter holes a small amount in an arbitrary direction. Then the transmission ratio is again computed. Again the filter holes 21 are incrementally moved a small amount in the same arbitrary direction and again the transmission ratio is calculated. This procedure is repeated for incremental positions of the filter holes 21 with regard to phosphor dot 20 until the same physical overlay orientation of holes 21 and phosphor dot 20 is achieved as existed for the first calculation. It will be noted that the transmission ratio calculated for each of the incremental positions of the filter holes 21 varies. The amount of variation is the important factor in designing the directional contrast enhancement filter and indicates the amplitude of moire interference patterns. With the different transmission ratios calculated for each of the incremental positions of filter holes 21, the average transmission ratio and the percent variation in light output is calculated for this initial set of data as described hereinafter.

Next the hole radius r is changed and another set of data is calculated as just described. After other sets of data are calculated for filter holes of radius r varying between 0.02 and 0.065 millimeters, the hole spacing $X_L$ is changed and the entire procedure is repeated. This process goes on for many hole spacings $X_L$ defining a ratio A between say 2.3 and 3.0 where Ratio $A=X_L/r$.

Figure 7:
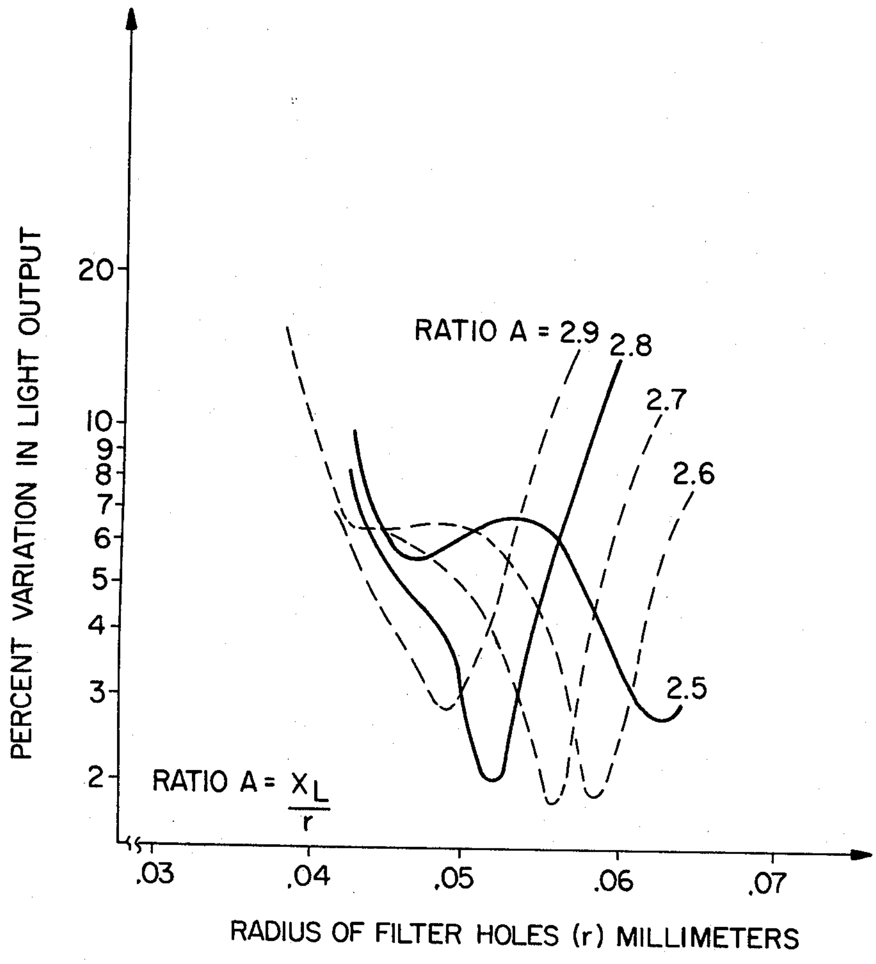
FIGS. 7 and 8 are graphs of data obtained from calculations used to select filter hole size and spacing to make the filter.
Figure 8:
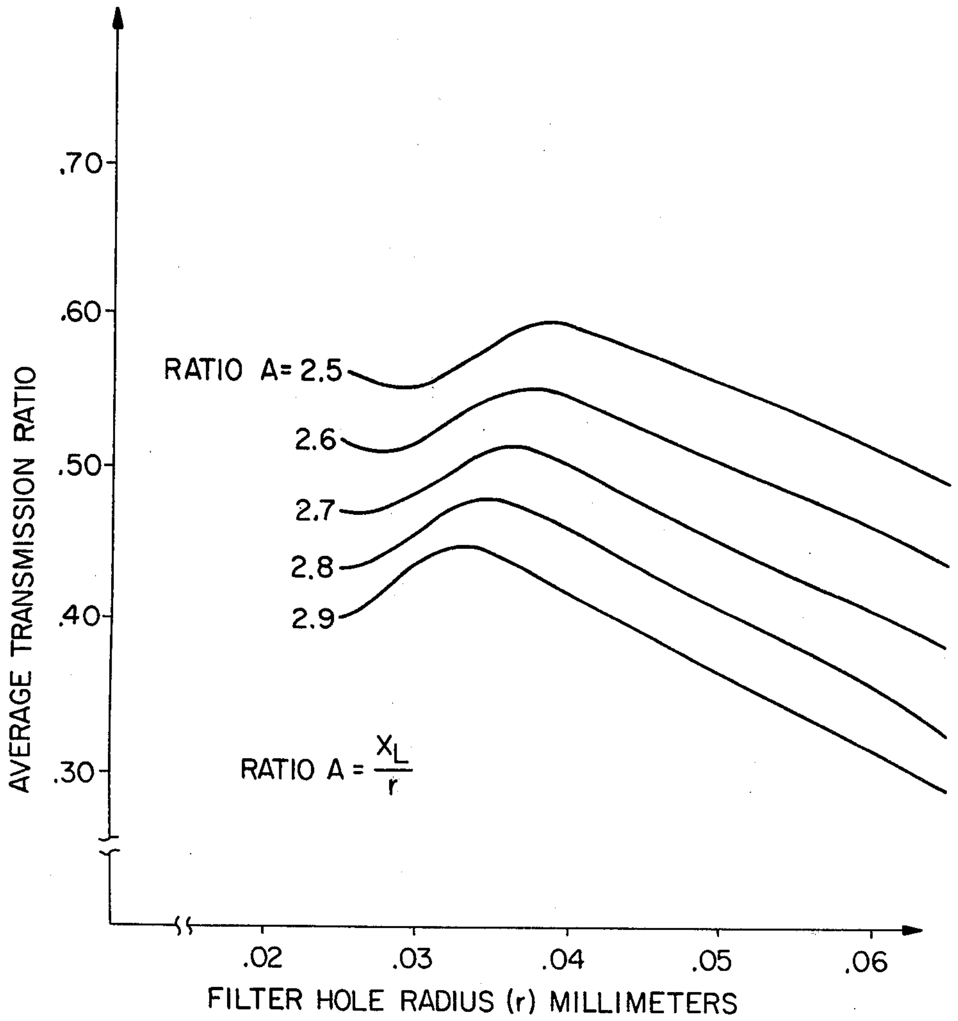

All this data now permits curves to be ploted such as shown in FIGS. 7 and 8. In FIG. 7 are shown curves representing values of Ratio A equal to 2.5, 2.6, 2.7, 2.8 and 2.9 for a phosphor dot size of 0.130 millimeters and the filter holes being in the pattern shown in FIG. 2.

Using the plurality of sets of data calculated as described immediately hereinabove the percent variation in light output and average transmission ratio needed for the graphs in FIGS. 7 and 8 respectively are calculated as now described.

One set of data was defined above as those transmission ratio values calculated for a fixed value of hole spacing $X_L$ and filter hole radius r when the overlay of the filter holes over a phosphor dot, as shown in FIG. 2, is shifted incremental amounts until the initial overlay pattern is repeated. To calculate the average transmission ratio the discrete calculated values for transmission ratio for one set of data is summed and then divided by the total number of values summed. To calculate the percent variation in light output, the minimum or lowest value of transmission ratio within one set of data is subtracted from the maximum or highest value of transmission ratio for the same set of data and the difference is then divided by the average transmission ratio calculated for the same set of data. Thus, each set of data yields one value for the average transmission ratio and one value of percent variation in light output.

From the values calculated as described in the last paragraph, the filter hole size r and Ratio A which equals $X_L/r$, one point is found on the plots in each of FIGS. 7 and 8. This calculation procedure is continued to find all the points plotted to obtain curves such as shown in FIGS. 7 and 8.

It should be noted that each of the curves on FIG. 7 has a valley point reflecting a minimum percent variation in light output for a particular Ratio A. The valley point indicates the minimum moire point for the filter of the particular Ratio A. In the example shown by the curves in FIG. 7 the percent variation in light output is least for Ratio A=2.7. However, for all curves on FIG. 7 the percent variation in light output is only in the order of 2% to 3%. The designer most likely would initially pick the curve with Ratio A=2.7, which has the lowest percent variation in light output. Checking FIG. 8 for Ratio A=2.7 with the same filter hole size of 0.056 millimeters as indicated in FIG. 7, we find that the average transmission ratio is 42%. If this is unacceptable a smaller filter hole size can be used at a smaller increase of percent variation in light output. For example, in FIG. 7 with Ratio A=2.7 the minimum percent variation occurs when the filter hole radius r=0.056 millimeters and is slightly less than 2%. Alternatively, by picking Ratio A=2.6 we still have a percent variation in the order of two percent with the filter hole radius r=0.058 millimeters, but the average transmission ratio increases to 48%. Going a step further, if we let Ratio A=2.5 and if 2.7 percent variation in light output is acceptable the average transmission ratio increases to 50%. All of these filter designs will yield unnoticeable or unobjectionable moire interference patterns. Utilizing our novel method, designers now have an ordered approach to making direction sensitive contrast type filters for shadow mask type color cathode ray tubes for use in high ambient light environments while achieving lower moire interference environments than in the prior art.

In an alternative approach the designer may select a maximum percent variation in light output or moire and then pick a point, not necessarily a minimum or valley point, on the portion of any curve below the maximum level chosen before proceeding with the design method described hereinabove.

The curves plotted on FIG. 7 reflect filter hole sizes in the range of 0.04 to 0.065 millimeters. If the calculations described above are repeated for smaller hole sizes there are other valley or minimum points that may be considered. These are not shown as the state of the art at this time precludes making filters with such small hole sizes.

The calculations described above in detail and performed in implementing our novel method may be performed on a computer. One skilled in the programming art, can readily write a computer program to perform the calculations and steps described in great detail hereinabove to greatly decrease the amount of manual calculations required to make a contrast enhancement filter utilizing our novel method.

While what has been described hereinabove is the preferred way of implementing our novel design method, it would be obvious to those skilled in the art that variations and changes may be made without departing from the spirit and scope of the invention. For instance, the data obtained may be graphed in different ways to aid in selecting the appropriate hole spacing $X_L$ and hole size for a filter. Another variation of our invention would be its application to shadow mask tubes that use other than circular phosphor dots, as for example, small rectangles with round ends, or different arrays of data such as row and column versus hexagonal.

Also while our exemplary graphs have been plotted only between 0.02 and 0.065 millimeters, and A ratios only between 2.3 and 3.0, it should be obvious that our invention applies for hole sizes below 0.02 and ratios between 2.0 and 2.3 as well. It being recognized that at these lower vaues higher transmissions and lower moire values will be obtained. We have limited our example because of practical considerations related to implementing these values into a practical filter, using normal etching methods. Other techniques such as etched fibre techniques can however be used to apply these above noted lower values for hole size and ratios.

What is claimed is:

1. A method for making a direction sensitive contrast enhancement filter from a planar piece of material to provide unnoticeable moire pattern interference when used with a shadow mask color cathode ray tube (CRT) display having a phosphor dot size substantially 0.130 millimeters diameter in high ambient light environments comprising the steps of:

(1) determining the center-to-center spacing and radius of a plurality of holes to be placed through said planar piece of material in making said filter by performing the substeps of:

(a) selecting a curve of a particular Ratio A in FIG. 7 of the drawings, where Ratio A equals the center-to-center spacing between filter holes divided by the radius of a filter hole, the valley or minimum point of said selected curve indicating a percent variation in light output and a filter hole size accordingly, (b) locating the point on a curve in FIG. 8 of the drawings having the same Ratio A and filter hole radius as selected and indicated in Substep (a) to determine the transmission ratio of a filter having holes of such radius and Ratio A, said transmission ratio being an indicator of the amount of light generated by said CRT that will pass through said filter, (c) determining if the transmission ratio indicated in Substep (b) is acceptable, and if said transmission ratio is acceptable going to Step (2), (d) when said transmission ratio is unacceptable as determined in Substep (b), selecting another curve on FIG. 7 having a new Ratio A, said new Ratio A having a lower numerical value to increase said transmission ratio and said Ratio A having a higher numerical value to decrease said transmission ratio, the minimum or valley of the curve in FIG. 7 for said new Ratio A indicating a new filter hole radius which along with said new Ratio A indicates a corresponding new transmission ratio on FIG. 8; and (2) producing holes through said planar piece of material to convert same to said direction sensitive contrast enhancement filter, each hole having the radius as determined by either Substeps (c) or (d) of Step (1) above, with all holes being equidistant, and the center-to-center spacing of said holes being determined by multiplying said Ratio A determined by either Substeps (c) or (d) of Step (1) above, by the filter hole radius determined from Steps (1) and utilized in producing said holes.

2. A method for making a direction sensitive contrast enhancement filter from a planar piece of material and having a plurality of holes therethrough of any given pattern such that the center-to-center spacing between said holes is equidistant and said filter provides unnoticeable moire pattern interference when used with a shadow mask type color cathode ray tube video display having color phosphor dots of a given radius in high ambient light environments comprising the steps of:

(1) determining the center-to-center spacing and radius of said plurality of holes to be placed through said planar material by performing the substeps of:

(a) picking an arbitrary first filter hole radius having a dimension between the radius of the smallest hole size that may be manufactured in the art and the radius of said color phosphor dots, (b) picking an arbitrary first center-to-center filter hole spacing having a dimension less than the diameter of said color phosphor dots and larger than one-half the radius of said color phoshor dots, (c) computing a first transmission ratio by overlaying said given pattern of filter holes with each hole having said first filter hole radius and said first hole spacing over a circle having a radius the same as said color phosphor dots by dividing the sum of the areas of the portion of ones of said filter holes that overlap said circle to the area of said circle, (d) computing a first plurality of transmission ratios including said first transmission ratio by moving the overlay of said pattern of filter holes a plurality of small increments in a fixed but arbitrarily chosen direction and computing the transmission ratio defined in Substep (c) for each incremental position, said increments continuing until the overlay initially observed in Substep (c) above is repeated, (e) computing a first Ratio A using said first filter hole radius r and said first filter hole spacing $X_L$, where Ratio A equals the center-to-center filter hole spacing between said equidistantly spaced filter holes divided by the radius of said filter holes, (f) computing a first average transmission ratio by summing the values obtained in Substep (d) above and dividing the sum by the discrete number equal to said plurality of incremental positions, (g) computing a first percent variation in light output by subtracting the minimum transmission ratio from the maximum transmission ratio both computed in Substep (d) as part of said first plurality of transmission ratios, dividing this difference by said first average transmission ratio computed in Substep (f) above and multiplying by 100%, (h) plotting the data obtained in performing Substeps (d), (e), (f) and (g) above as one point on each of two graphs, the first graph having percent variation in light output on the Y axis with filter hole radius on the X axis, and the second graph having average transmission ratio on the Y axis, and filter hole radius on the X axis, (i) picking a plurality of filter hole radii incremented in both a positive and a negative direction from said first filter hole radius but between said limits defined in Substep (a) above and, using said first center-to-center filter hole spacing, repeating Substeps (c), (d), (e), (f), (g), and (h) above, (j) picking a plurality of filter hole spacings incremented in both a positive and negative direction from said first filter hole spacing but between said limits defined in Substep (b) above and, using each of said plurality of filter hole radii defined in Substep (i) above, including said first filter hole radius, repeat Substeps (c), (d), (e), (f), (g) and (h) above, (k) selecting a curve of a particular Ratio A on said first graph defined in Substep (h) above, the valley or minimum point of said selected curve indicating a percent variation in light output and a filter hole size accordingly, on the axis of said first graph, (l) locating the point on a curve in said second graph defined per the data obtained in Substeps (i) and (j) above and having the same Ratio A and filter hole radius as indicated in Substep (k) to determine the average transmission ratio of a filter having holes of such radius and Ratio A, (m) determining if the average transmission ratio indicated in Substep (l) is acceptable and, if said average transmission ratio is acceptable, going to Step (3), (n) when said average transmission ratio determined in Substep (l) is unacceptable, selecting another curve on said first graph having a new Ratio A, said new Ratio A having a lower numerical value to increase said average transmission ratio and said Ratio A having a higher numerical value to decrease said average transmission ratio, the minimum or valley of the curve in said first graph for said new Ratio A indicating a new filter hole radius which along with said new Ratio A indicates a corresponding new average transmission ratio on said second graph; and (2) producing holes through said planar piece of material to convert same to said direction sensitive contrast enhancement filter, each hole having the radius as determined by either Substeps (m) or (n) of Step 1 above for an acceptable level of average transmission ratio and percent variation in light output, with all holes being equidistant and the center-to-center spacing of said holes being determined by multiplying the Ratio A by the filter hole radius, both determined by either Substeps (m) or (n) of Step (1).

3. A method for making a direction sesitive contrast enchancement filter from a planar piece of material to provide unnoticeable moire pattern interference when used with a shadow mask color cathode ray tube (CRT) in high ambient light environments comprising the steps of:

(1) determining the center-to-center spacing and radius of a plurality of holes to be placed through said planar piece of material in making said filter by performing the substeps of:

(a) choosing an allowable percent variation in light output reflecting a tolerable moire interference level, (b) selecting a point only on that portion of one of said curves of a particular Ratio A in FIG. 7 of the drawings below said chosen allowable percent variation in light output, where Ratio A equals the center-to-center spacing between filter holes divided by the radius of a filter hole, the valley or minimum point of said selected curve indicating a percent variation in light output and a filter hole size accordingly, (c) locating the point on a curve in FIG. 8 of the drawings having the same Ratio A and filter hole radius as selected and indicated in Substep (b) to determine the transmission ratio of a filter having holes of such radius and Ratio A, said transmission ratio being an indicator of the amount of light generated by said CRT that will pass through the filter, (d) determining if the transmission ratio indicated in Substep (c) is acceptable, and if said transmission ratio is acceptable going to step (2), (e) when said transmission ratio is unacceptable as determined in Substep (c), selecting another curve on FIG. 7 having a new Ratio A, said new Ratio A having a lower numerical value to increase said transmission ratio and said Ratio A having a higher numerical value to decrease said transmission ratio, the minimum or valley of the curve in FIG. 7 for said new Ratio A, indicates a corresponding new transmission ratio on FIG. 8; and (2) producing holes through said planar piece of material to convert same to said direction sensitive contrast enhancement filter, each hole having the radius as determined by either Substeps (d) or (e) of Step (2) above, with all holes being in the pattern being equidistant, and the center-to-center spacing of said holes being determined by multiplying the Ratio A determined by either Substeps (d) or (e) of Step (1) above, by the filter hole radius determined from Step (1) and utilized in producing said holes.

4. Method as described in claim 3, wherein the CRT has a phosphor dot size in the range of approximately 0.065 millimeters to approximately 0.130 millimeters.

5. Method as described in claim 3, wherein the CRT has a phosphor dot size of approximately 0.130 millimeters.

6. Method as described in claim 3, wherein the CRT has a phosphor dot size of approximately 0.065 millimeters.

7. Contrast enhancement filter of the type made from a planar piece of material having a plurality of holes therethrough, with the holes having a pattern in which the center-to-center spacing of the holes is equidistant for use with a shadow mask color cathode ray tube (CRT) having color phosphor dots of a given radius, characterized by:

establishing the size and spacing of the holes in accordance with the method of claim 2, the filter thereby providing unnoticeable moire pattern interference.

* * * * *